(12) United States Patent
Hara et al.

(10) Patent No.: US 6,738,812 B1
(45) Date of Patent: May 18, 2004

(54) MIB INTEGRATIVE MANAGEMENT METHOD FOR AN ATM SERVER

(75) Inventors: Minori Hara, Tokyo (JP); Masahiro Jinnai, Fukuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/570,052

(22) Filed: May 12, 2000

(30) Foreign Application Priority Data

May 14, 1999 (JP) .......................................... 11-135008

(51) Int. Cl.[7] .......................... G06F 15/16; H04L 12/26
(52) U.S. Cl. ...................................... 709/224; 709/208
(58) Field of Search ................................. 709/208, 209, 709/223, 224, 225, 226, 227; 379/242, 350; 370/241, 242, 254

(56) References Cited

U.S. PATENT DOCUMENTS

| | | | | |
|---|---|---|---|---|
| 5,561,769 | A | | 10/1996 | Kumar et al. .......... 395/200.05 |
| 5,651,006 | A | | 7/1997 | Fujino et al. ................ 370/408 |
| 5,678,006 | A | | 10/1997 | Valizadeh et al. ..... 395/200.02 |
| 5,930,238 | A | * | 7/1999 | Nguyen ....................... 370/260 |
| 5,991,892 | A | | 11/1999 | Honda ............................. 714/4 |
| 5,999,525 | A | * | 12/1999 | Krishnaswamy et al. ... 370/352 |
| 6,105,065 | A | * | 8/2000 | Rao et al. .................... 709/224 |
| 6,175,866 | B1 | * | 1/2001 | Holloway et al. .......... 709/223 |
| 6,324,275 | B1 | * | 11/2001 | Yagel et al. ................. 709/104 |
| 6,349,332 | B2 | * | 2/2002 | Hayball et al. ............. 709/223 |
| 6,381,627 | B1 | * | 4/2002 | Kwan et al. ................. 709/201 |
| 6,473,411 | B1 | * | 10/2002 | Kumaki et al. ............. 370/331 |
| 6,523,064 | B1 | * | 2/2003 | Akatsu et al. .............. 709/226 |
| 6,560,196 | B1 | * | 5/2003 | Wei .......................... 370/230.1 |

FOREIGN PATENT DOCUMENTS

| | | |
|---|---|---|
| JP | 7-183932 | 7/1995 |
| JP | 7-226777 | 8/1995 |
| JP | 7-319793 | 12/1995 |
| JP | 7-334445 | 12/1995 |
| JP | 9-331334 | 12/1997 |
| JP | 10-145363 | 5/1998 |
| JP | 11-68778 | 3/1999 |
| JP | 11-205320 | 7/1999 |
| JP | 2001-5758 | 1/2000 |
| JP | 2000-181823 | 6/2000 |

OTHER PUBLICATIONS

Konopka et al., "A multilayer–architecture for SNMP–based, distributed and hierarchical management of local area networks", Computer Comm. and Networks, 4th Intl. Conf. 1995, pp. 272–279.*
Choi et al., "A method of gathering end–to–end management information", Network Operations and Management Symposium, 1998, NOMS 98, IEEE. v.3 pp. 849–858.*
Ng. W.F. et al. "MIBlets: a pratical approach to virtual network management", Integrated Network Management, 1999. Distributed Management for the Networked Millennium. 1999, p.201–215.*
Article—"Proceedings of the 1998 IEICE General Conference", 1998, B–6–38.

* cited by examiner

*Primary Examiner*—Dung C. Dinh
(74) *Attorney, Agent, or Firm*—Foley & Lardner

(57) ABSTRACT

An management information base integrative management method for an asynchronous transfer mode server is disclosed which reduces the load to be applied to CPU processing of an ATM switch body and minimize the influence upon the processing capacity of the other functions then the SNMP function. Upon accessing, from a network management system (NMS) through an ATM switch in which a plurality of servers are incorporated, a management information base of any of the servers in accordance with an SNMP procedure, one of the servers is set as a master server and the others are set as slave servers. Then, from the ATM switch, the master server is accessed representatively in accordance with the SNMP procedure, and from the master server, any of the slave servers is accessed over a virtual connection (VC). A PVC is used for the communication between the ATM switch and the master server, and an SVC is used for the communication between the master server and any of the slave servers.

16 Claims, 17 Drawing Sheets

FIG.3(A)

MASTER SERVER ADDRESS

| [Net-Prefix:26] | + [ESI:12] | + [SEL:2] |
|---|---|---|
| 39392f........... | + 00004cc4ffff | + ff |
| | (FIXED *1) | (FIXED) |

(*1)  00004cc4    + ffff (MAKER CODE (EXAMPLE: NEC) + MISSING NUMBER)

FIG.3(B)

SLAVE SERVER ADDRESS

| [Net-Prefix:26] | + [ESI:12] | + [SEL:2] |
|---|---|---|
| 39392f........... | + MAC-ADDRESS | + SLOT |
| | (FIXED *2) | + (INCORPORATED SLOT NUMBER) |

(*2) MAC ADDRESS UNIQUE TO PACKAGE

FIG.7

| MIB | INDEX | INCORPORATED POSITION |
|---|---|---|
| LesConfEntry | 1 | 5 |
| LesConfEntry | 2 | 5 |
| LesConfEntry | 3 | 5 |
| LesConfEntry | 4 | 2 |
| LesConfEntry | 5 | 2 |

MIB INTEGRATIVE MANAGEMENT METHOD FOR AN ATM SERVER

BACKGROUND OF THE INVENTION

1. Field of the Invention

This invention relates to a method of integratively managing, in an apparatus which transmits and receives ATM cells making use of an asynchronous transfer mode (hereinafter referred to as "ATM") network, MIBs (Management Information Bases) provided in a plurality of servers for ATM communication.

2. Description of the Related Art

A conventional management method has the following problems.

The first problem is that, in environment wherein various ATM communication server modules are incorporated in the same ATM switch apparatus, if the ATM switch body performs Simple Network Management Protocol (SNMP) communication with all of the server modules, then a high load is applied to processing of a CPU of the ATM switch body, which has a bad influence upon the other processing than the SNMP.

The second problem is that, in environment wherein various ATM communication server modules are incorporated in the same ATM switch apparatus, if local processor communication is use for SNMP communication between a CPU of the ATM switch body and CPUs of servers, then the load of the traffic applied to the local processor communication increases, which has a bad influence on communication which is more significant than the SNMP communication, for example, on communication for incorporation state management or apparatus failure management.

The third problem is that, even if it is assumed that the second problem described above is solved and SNMP communication is performed by virtual connection (hereinafter referred to as "VC") communication, if all VCs are made permanent virtual connections (hereinafter referred to as "PVCs"), then normally necessary VC resources are consumed and the VC resources are uselessly consumed much.

The fourth problem is that the conventional management method is a closely coupled system wherein, since an SNMP interface is incorporated in an ATM switch and MIB get interface is incorporated in each server module, each time addition/modification to an application MIB of a server module is performed, addition/modification also to the SNMP interface of the ATM switch is required.

Another method is disclosed in Japanese Patent Laid-Open No. Hei 7-226777 and Japanese Patent Laid-Open No. Hei 7-319793 wherein, as a method of managing a network hierarchically, an integrative manager, a sub manager and an agent are arranged discretely as separate apparatus on a network and communication between the managers and the agent is performed with the SNMP. While the method uses the SNMP, SNMP communication is performed between external apparatus through the network.

SUMMARY OF THE INVENTION

It is an object of the present invention to lower, when, where a plurality of servers are incorporated in an ATM switch apparatus, a network management system accesses a management information base of any of the servers of the ATM switch in accordance with an SNMP procedure, the load applied to CPU processing of the ATM switch body to minimize the influence to be had upon the processing capacity for the other functions than the SNMP function.

In order to attain the object described above, according to the present invention, there is provided an management information base integrative management method for an asynchronous transfer mode server for accessing, from a network management system through an asynchronous transfer mode switch apparatus in which a plurality of servers are incorporated, a management information base of any of the servers in accordance with a simple network management protocol procedure, comprising the steps of setting one of the plurality of servers as a master server and setting the other ones of the plurality of servers as slave servers, accessing, from the asynchronous transfer mode switch, the master server representatively in accordance with the simple network management protocol procedure, and accessing, from the master server, any of the slave servers over a virtual connection.

The simple network management protocol communication between the asynchronous transfer mode switch and the master server may be performed over a virtual connection. In this instance, preferably a permanent virtual connection is used for the communication between the asynchronous transfer mode switch and the master server, and a switched virtual connection is used for the communication between the master server and any of the slave servers. Further, upon setup over the switched virtual connection between the master server and any of the slave servers, the slave server may start up a timer thereof and retry the setup at a set time of the timer.

Preferably, the master server uses index information for management of the slave servers, and index updating notification/response are performed between the master and slave servers. In this instance, in an index collection phase, timeout supervision of a response may be performed upon index updating from any of the slave servers to the master server. Further, when timeout of the index updating response occurs, preferably re-sending processing of the index updating notification is performed.

Preferably, when the asynchronous transfer mode switch body communicates with the master server in an simple network management protocol operation phase, the asynchronous transfer mode switch body communicates in a unit of an management information base group using a Get/Set common function. In this instance, timeout supervision of the Get/Set response may be performed between the asynchronous transfer mode switch and the master server and between the master server and any of the slave servers in the simple network management protocol operation phase.

Preferably, when the master server suffers from a failure, the asynchronous transfer mode switch body automatically detects the failure and informs the slave servers of the failure so that the master-slave operation is stopped, but when one of the slave servers suffers from a failure, the asynchronous transfer mode switch body automatically detects the failure and informs the master server of the failure so that registration of a slave index number managed by the master server is deleted.

The management information base integrative management method described above is advantageous in that, since simple network management protocol communication with all slave servers is trusted with the master server, the load applied to CPU processing of the asynchronous transfer mode switch body is reduced and the influence upon the processing capacity of the other functions than the simple network management protocol function can be minimized.

The management information base integrative management method is advantageous further in that, since communication between local processors is not used but communication over a virtual connection is used for simple network management protocol communication between the asynchronous transfer mode switch body and the master server and between the master server and any of the slave servers, the communication traffic between local processors can be reduced and the influence upon communication between local processors other, than the simple network management protocol can be minimized.

The management information base integrative management method is advantageous also in that, since communication between the master server and a slave server is performed over a switched vertical connection, consumed resources can be minimized when compared with another case wherein they are normally connected to each other by a permanent vertical connection.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 3(A) and 3(B) are diagrammatic views illustrating a method of allocating ATM addresses to servers;

FIG. 7 is a diagrammatic view showing an example of an index number table of a LAN Emulation Server;

DESCRIPTION OF THE PREFERRED EMBODIMENT

Figure 1:
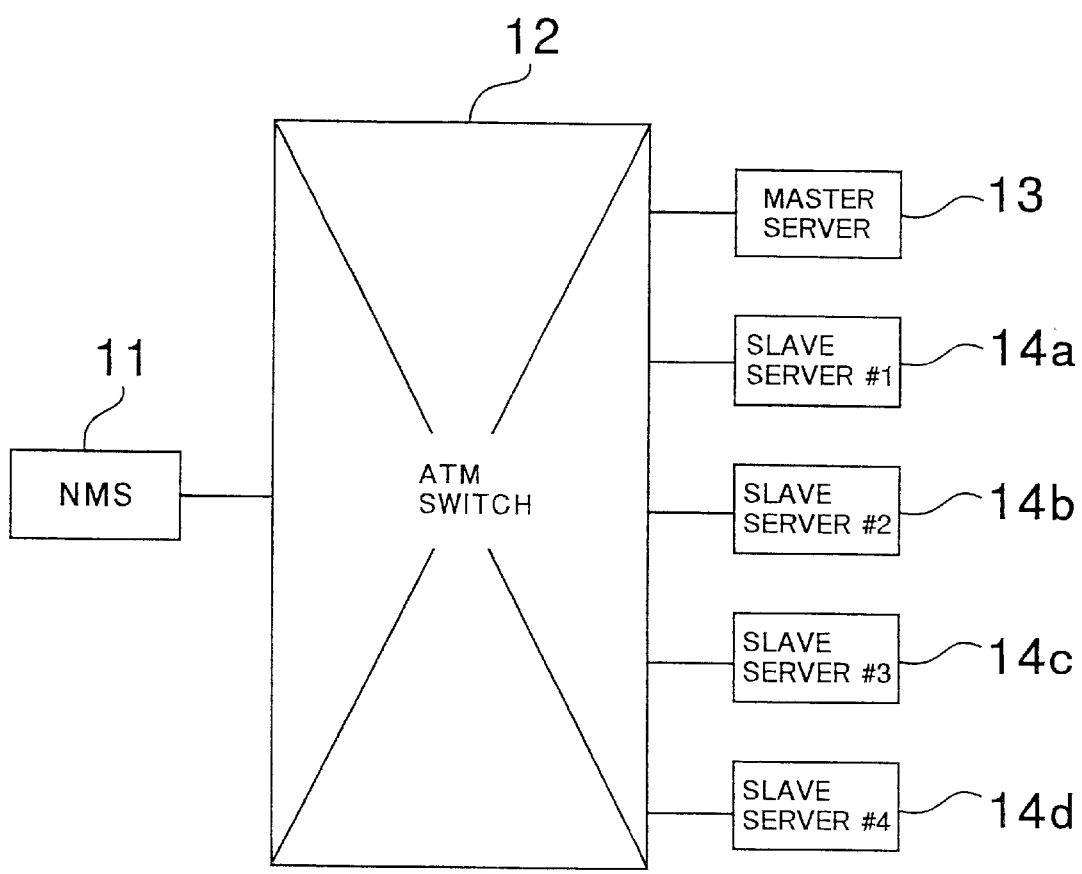
FIG. 1 is a block diagram of a system to which a management method according to the present invention is applied.

FIG. 1 shows an example of a construction of a system to which a management method according to the present invention is applied. Referring to FIG. 1, the system shown includes a network management system (hereinafter referred to as "NMS") 11, an ATM switch 12, and a plurality of ATM communication servers. The ATM communication servers can be classified into a single master server 13 and other slave servers 14 based on roles playing on MIB (Management Information Base) management. In FIG. 1, the system is shown including four slave servers 14a to 14d.

The NMS 11 accesses MIBs incorporated in the ATM switch 12 and the servers 13 and 14 in accordance with a procedure of the SNMP (Simple Network Management Protocol) to write or read out data for management. The servers 13 and 14 are incorporated in the ATM switch 12, and accessing from the NMS 11 to the servers 13 and 14 is all performed through an SNMP interface of the ATM switch body 12.

Here, although the type of the ATM communication servers is not defined by the present invention, it supposes such as follows.

(1) ATM Forum "LAN Emulation Over ATM Version 2" (AF-LANE-0084.000)

LAN Emulation Server (LES) LAN Emulation Configuration Server (LECS) Broadcast and Unknown Server (BUS)

(2) ATM Forum "Multi-Protocol Over ATM Version 1.0" (MPOA:

AF-MPOA-0087.000) MPOA Server (MPS) Next Hop Server (NHS)

(3) IFTF "Classical IP and ARP over ATM" (RFC1577) ARP Server

Further, in order to realize ATM communication, the "servers" in the client-server system shall all be within the range of application of the present invention.

Figure 2:
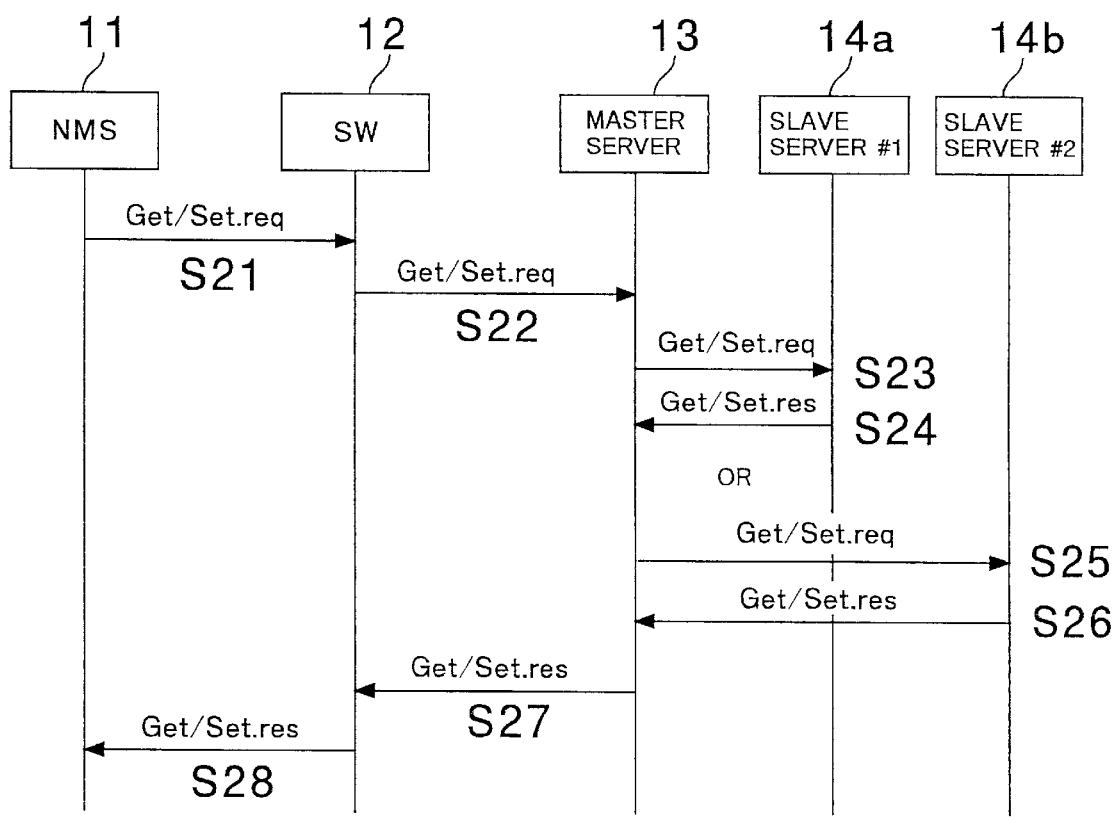
FIG. 2 is a sequence chart illustrating an outline of SNMP communication between component apparatus of the system shown in FIG. 1.

Subsequently, an outline of SNMP communication between the component apparatus is described with reference to FIG. 2.

When the NMS 11 tries to access the MIB of a server in accordance with an SNMP procedure, it first transmits a message (S21) of Get Request for reading out of data from or Set Request for writing of data into the MIB to the ATM switch 12. The ATM switch 12 transfers the request to the master server 13 (S22). The master server 13 receiving the request transmits a Get/Set Request (S23) to the first slave server 14a and receives a Get/Set Response (S24) as a reply from the first slave server 14a.

Then, the master server 13 transmits a Get/Set Request (S25) to the second slave server (14b) and receives a Get/Set Response (S26) as a reply from the second slave server 14b. Thereupon, the ATM switch 12 and the slave servers 14 do not communicate an SNMP message directly with each other. The master server 13 receiving all replies of the slave servers 14 (14a to 14d) in this manner transmits the replies collectively to the ATM switch 12 (S27), which in turn transmits, the replies finally to the NMS 11 (S28).

For the communication between the master server 13 and the slave servers 14, communication over a VC (Virtual Connection) is adopted in order that it may not have an influence on the information processing capacity of the ATM switch body 12. Further, since the incorporation situation of the servers and the number of modules vary, VCs cannot be set fixedly in advance.

Accordingly, an SVC (Switched Virtual Connection) is used to assure a VC in accordance with the necessity for communication between servers. In order to set an SVC between servers, it is necessary to use an ATM signaling procedure (ATM Forum "ATM User-Network Specification Version 3.1" and etc.), and to this end, an ATM address for signaling termination must be allocated to each of the master server 13 and the slave servers 14.

In summary, according to the present invention, when accessing (S21) to the MIB of a server from the NMS 11 through the ATM switch 12 in accordance with a procedure of the Simple Network Management Protocol (SNMP) is to be performed, SNMP accessing from the ATM switch 12 to all of the servers which belong to the ATM switch 12 is not performed, but accessing (S22) representatively to the master server 13 is performed, and any of the slave servers 14 is accessed from the master server 13. Further, for SNMP communication between the ATM switch 12 and the master server 13 and between the master server 13 and each of the slave servers 14, a connection by a VC is used but communication between local processors of the ATM switch 12 and a server is not used as hereinafter described in connection with steps 4B and 4D of FIG. 4 and steps 5C and 5F of FIG. 5.

Consequently, the load applied to the ATM switch body is reduced, and the influence upon the processing capacity of the other functions than the SNMP function can be minimized.

Figure 13:
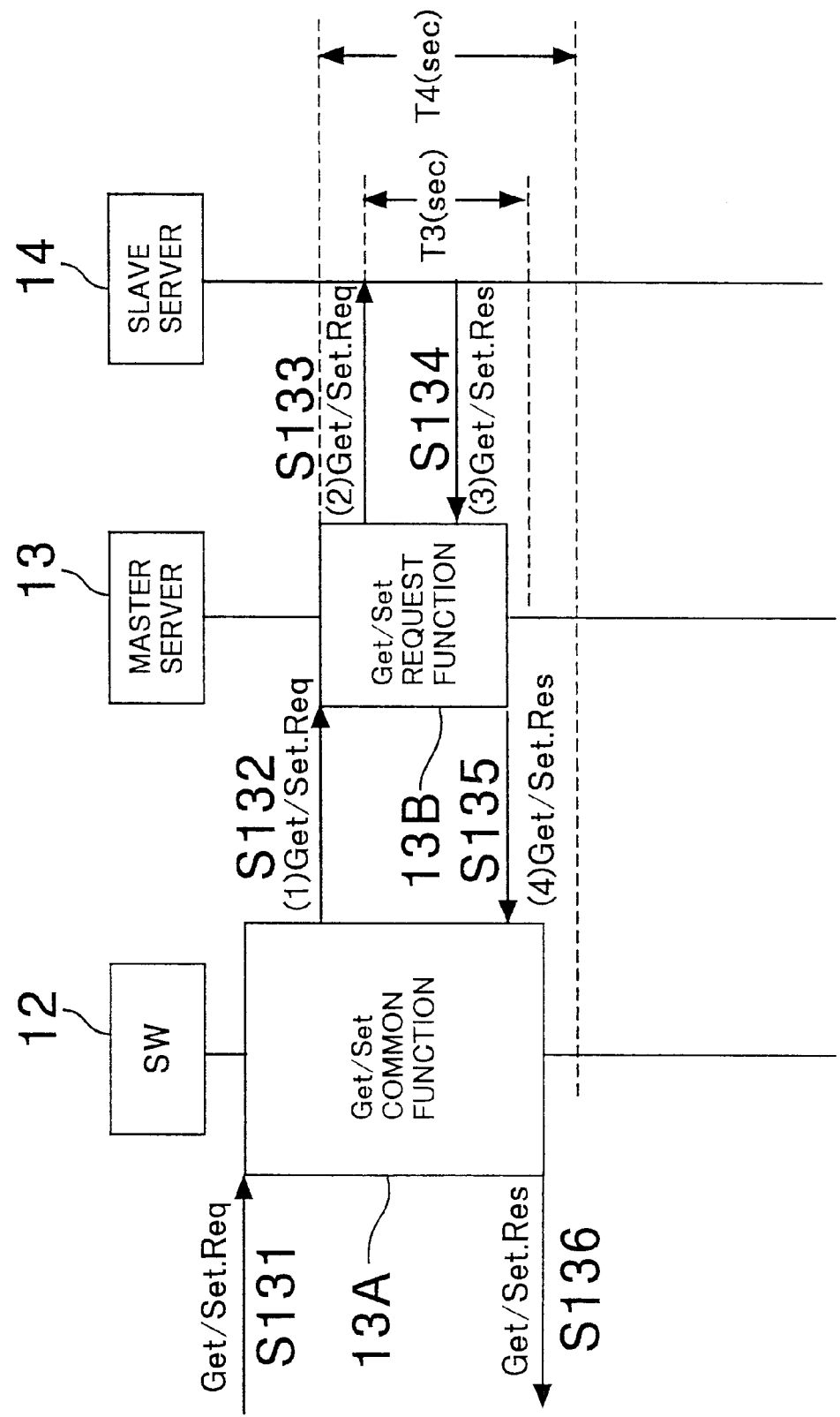
FIG. 13 is a sequence chart illustrating an SNMP operation phase (normal processing)

FIGS. 3(A) and 3(B) illustrate an allocation method of ATM addresses to the master server 13 and the slave servers 14. If "master setting" is performed for a server using a management command, then as shown in FIG. 3(A), 13 bytes similar to those for the ATM switch are allocated to the Network Prefix (NP) part, a totaling 6 bytes including 4 bytes for a maker identification number +"ffff" fixed are allocated to the End System Identifier (ESI) part, and one byte of "ff" fixed is applied to the selector (SEL) part. On the other hand, if "slave setting" is performed for a server using a management command, then as shown in FIG. 3(B), 13 bytes similar to those for the ATM switch and those upon master setting are allocated to the NP part, 6 bytes of a MAC address (Media Access Control protocol of the IEEE LAN Specifications) unique to the hardware of the server are allocated to the ESI part, and one byte for the incorporation position (slot number or module number) of the server in the ATM switch apparatus is allocated to the SEL.

Since the ATM address of the master server 13 is fixedly determined as viewed from the slave servers 14, a signaling procedure is started with a SETUP request from a slave server 14 side. Further, even if a plurality of modules of slave servers 14 are present, since the MAC address and the incorporation position are allocated uniquely to each module, the same ATM address is not allocated at all. Centralized management of the MIBs of all of the slave servers 14 by the master server 13 is realized by one to multiple bidirectional communication through an SVC.

As described above, the system is constructed such that the master server 13 can perform MIB management of all of the slave servers 14 integratively.

Subsequently, operation of the system described above is described in detail with reference to the drawings.

1. Initialization Phase

In the initialization phase, VCs between the ATM switch 12 and the master server 13 and between the master server 13 and a slave server 14 are established to make preparations in order that SNMP communication may be performed between the ATM switch 12 and the master server 13 and between the master server 13 and any slave server 14.

1.1 Initialization Based on Command Setting

Figure 4:
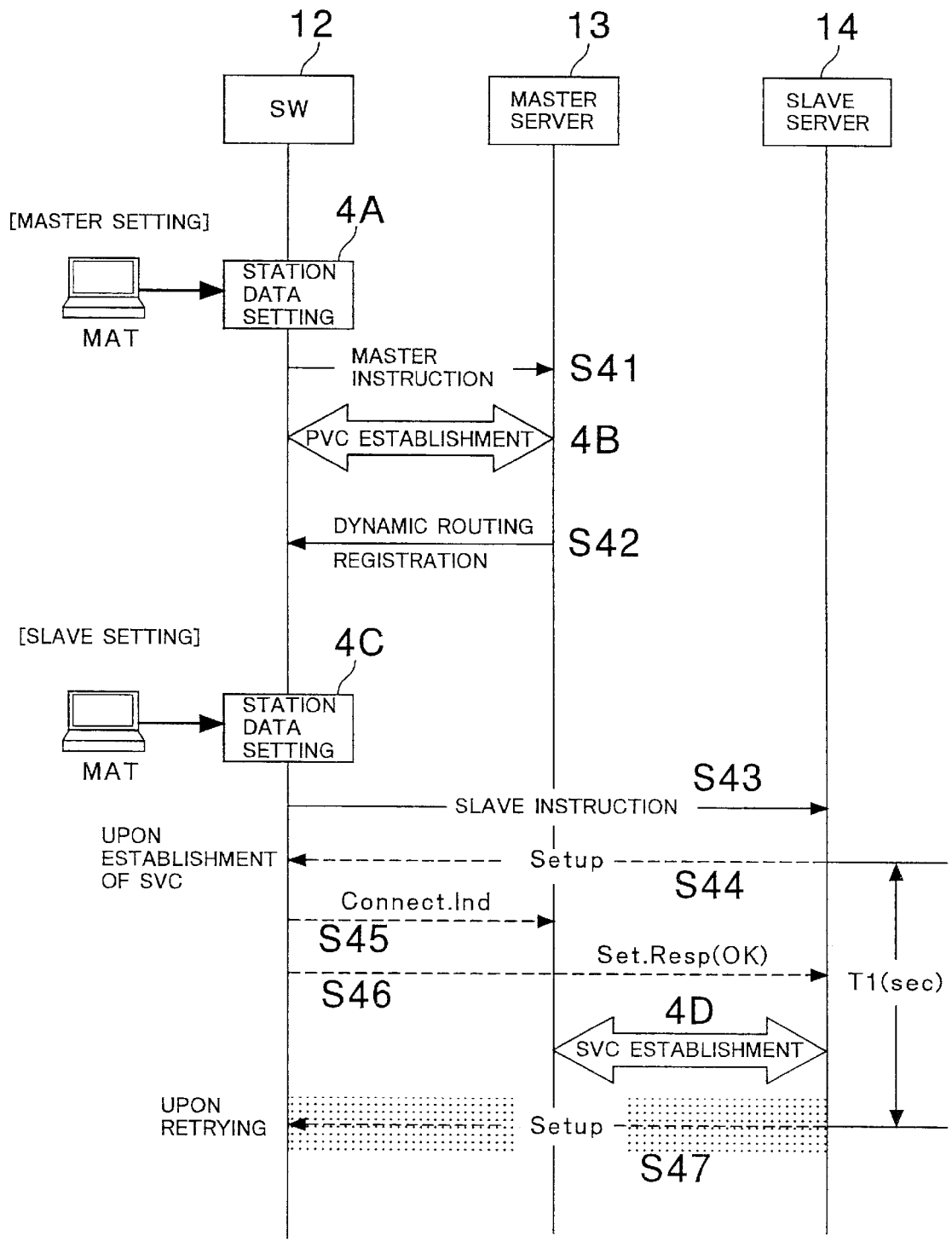
FIG. 4 is a sequence chart illustrating initialization by command setting.

Description is given with reference to FIG. 4.

Now, it is assumed that two servers are incorporated in the ATM switch 12, and one of the servers is set as the master server 13 and the other is set as a slave server 14. If a manager performs "MASTER setting" using a command, then the setting is stored as setting data (incorporation position information) of the master server 13 into the ATM switch 12 (4A). The setting data is hereinafter referred to as "station data". After the station data is set, a MASTER instruction (S41) is transmitted from the ATM switch 12 to the master server 13 by process to process communication, and the master server 13 recognizes that it itself should operate as the master. Thereafter, a PVC (Permanent Virtual Connection) (4B) is established between the ATM switch 12 and the master server 13 to make preparations for later SNMP communication.

Thereafter, the master server 13 performs dynamic routing registration (S42) of the ATM address of the master server 13 itself illustrated in FIG. 3(A) into the ATM switch 12. The dynamic routing information is required later in order to transfer a SETUP message for establishment of an SVC (Switched Virtual Connection) from the slave side to the master side. At this point of time, the master server 13 enters a SETUP waiting condition from the slave server 14.

If the manager performs "SLAVE setting" using a command, then the setting is stored as station data (incorporation position information) of the slave server 14 into the ATM switch 12 (4C), and a SLAVE instruction (S43) is transmitted to the slave server 14 by process to process communication. The slave server 14 receiving the SLAVE instruction transmits SETUP in a period of T1 [sec] to the master server 13 through the ATM switch 12 (S44) and performs retrying (S47) until an SVC to the master server 13 is successfully established.

The slave server 14 uses the ATM address illustrated in FIG. 3(B) to transmit SETUP to the destination ATM address of the master server 13 by dynamic routing. If the slave server 14 succeeds in the signaling procedure for SVC establishment, then it notifies the master server 13 of Connection Indication (S45), and the master server 13 returns Set Response (OK) (S46) to the slave server 14, which is the source of the SVC request, thereby to establish an SVC (4D).

1.2 Initialization based on Power-on Restarting or Insertion of a Server

Figure 5:
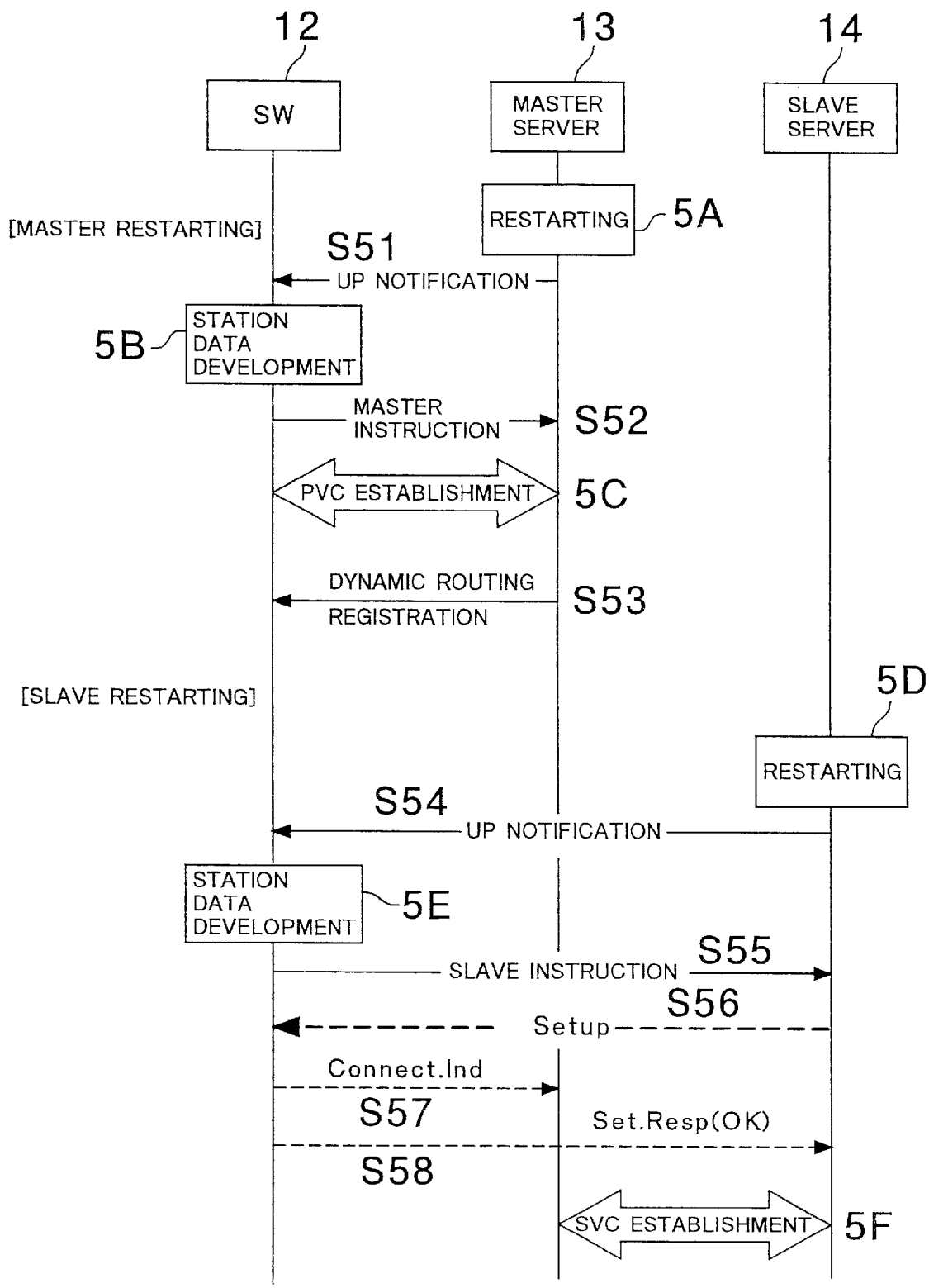
FIG. 5 is a sequence chart illustrating initialization by Power-On restarting or insertion of a server.

Initialization processing when the power supply to the entire ATM switch apparatus is made available or upon insertion of a server module during operation of the ATM switch is described with reference to FIG. 5.

After the master server 13 is started and restarting processing (5A) is completed, it performs UP notification (S51) to the ATM switch 12. The ATM switch 12 develops station data of the server of the source of transmission of the UP notification (5B), and if it founds that the server of the transmission source is the master server 13, then it performs MASTER instruction (S52). Thereafter, PVC establishment (5C) and dynamic routing registration (S53) are performed similarly as upon the "initialization based on command setting".

Similarly, after the slave server 14 is started and restarting processing (5D) is completed, it performs UP notification (S54) to the ATM switch 12. The ATM switch 12 develops station data of the server of the transmission source of the UP notification (5E), and when it founds that the server of the transmission source is the slave server 14, then it performs SLAVE instruction (S55). Thereafter, an SVC is established through communication of SETUP (S56), Connect Indication (S57) and Set Response (OK) (S58) similarly as upon the "initialization based on command setting" (5F).

It is to be noted that, if station data setting of the master and slaves does not exist upon starting of the servers, initialization processing similar to that of FIG. 4 is performed only after a command is inputted by the manager.

2. Index Collection Phase

Figure 6:
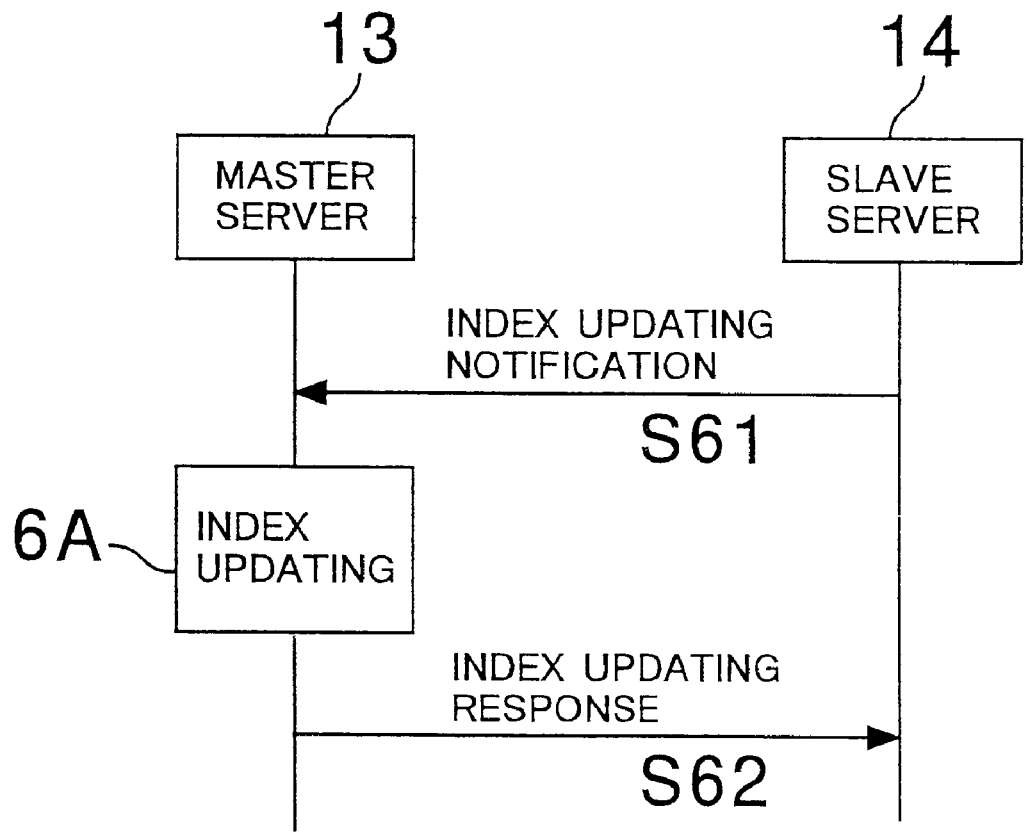
FIG. 6 is a sequence chart illustrating an index collection phase.

The master server 13 manages indices of all of the slave servers 14 which are managed thereby. As shown in FIG. 6, upon addition/deletion of setting data to/from an application (hereinafter referred to as "APL") on the slave server 14 by entry of a command or upon addition/deletion of an MIB by a state change by an APL operation, it is necessary to perform index updating notification (S61) to the master server 13 so that synchronism may be established. The master server 13 receiving the index updating notification performs index updating (6A) and returns an index updating response (S62) to the slave server 14.

FIG. 7 illustrates an index collection phase where a LAN Emulation Server (LES) is incorporated in the slave servers 14. A slave server module is incorporated in each of the slots of the slot numbers 5 and 2, and totaling five MIB entries "lesConfEntry" of the LES are present on the two modules. To the five MIBs, the index numbers 1 to 5 are allocated.

2.1 Index Updating Upon Restarting

Figure 8:
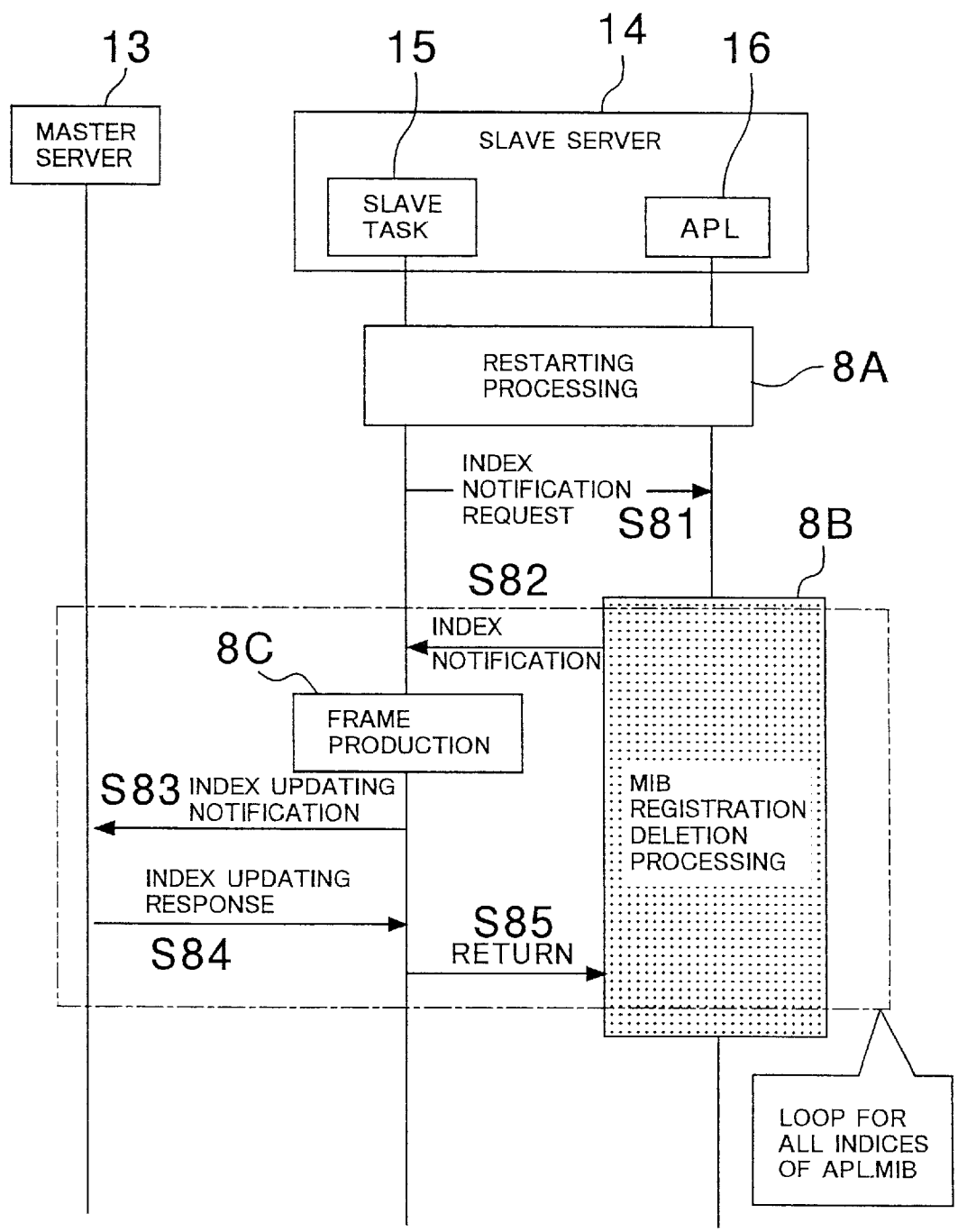
FIG. 8 is a sequence chart illustrating index updating upon re-starting.

Index updating upon restarting of a slave server is described with reference to FIG. 8.

Here, for description of operation, the slave server 14 is divided into a slave task 15 and an APL 16. After the slave server 14 is restarted,(8A), an index notification request (S81) is sent from the slave task 15 to the APL 16. The APL 16 executes an MIB registration/deletion processing routine (8B) until index updating is completed thereafter. When an index notification (S82) is sent from the APL 16 to the slave task 15, the slave task 15 performs frame production (8C) and sends an index updating notification (S83) to the master server 13. After the index updating is completed in the master server 13, the master server 13 transmits an index updating response (S84) to the slave task 15. Further, RETURN (S85) is sent from the slave task 15 to the APL 16.

The processing from the steps S82 to S85 is repetitively processed by a number of times equal to the total number of all indices present on the APL 16. When the processing is completed, the MIB registration/deletion processing routine (8B) is ended.

2.2 Index Updating Based on an APL Command

Figure 9:
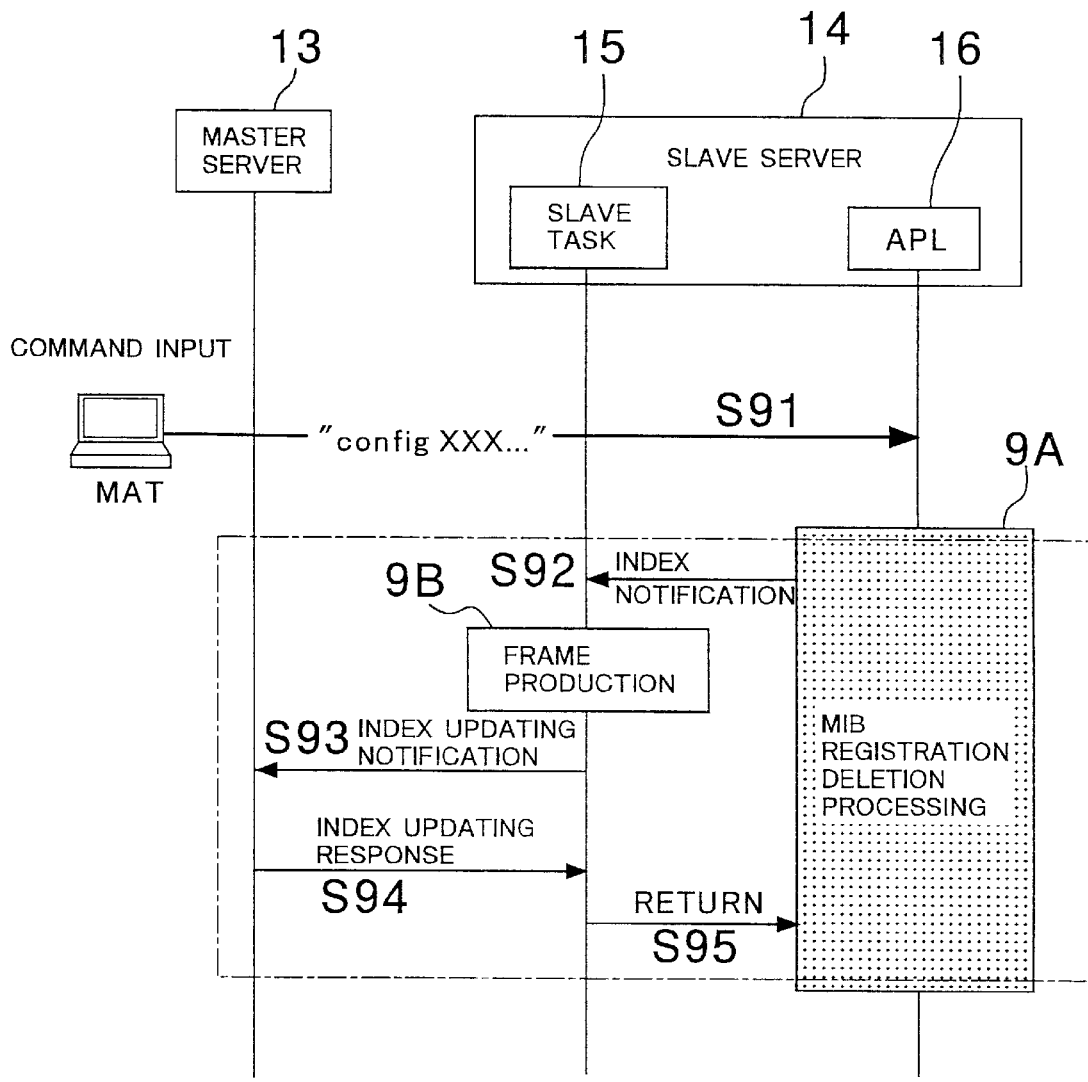
FIG. 9 is a sequence chart illustrating index updating based on an APL command.

Index updating based on an APL command is described with reference to FIG. 9.

If the manager performs setting addition/deletion (S91) for the APL 16 of the slave server 14 by inputting a command, then an MIB registration/deletion processing routine (9A) is started. Thereafter, index updating is performed similarly to the processing in the steps 8B et seq. of FIG. 8 described hereinabove (9A, S92 to S95 of FIG. 9).

2.3 Index Updating Based on an APL State Change

Figure 10:
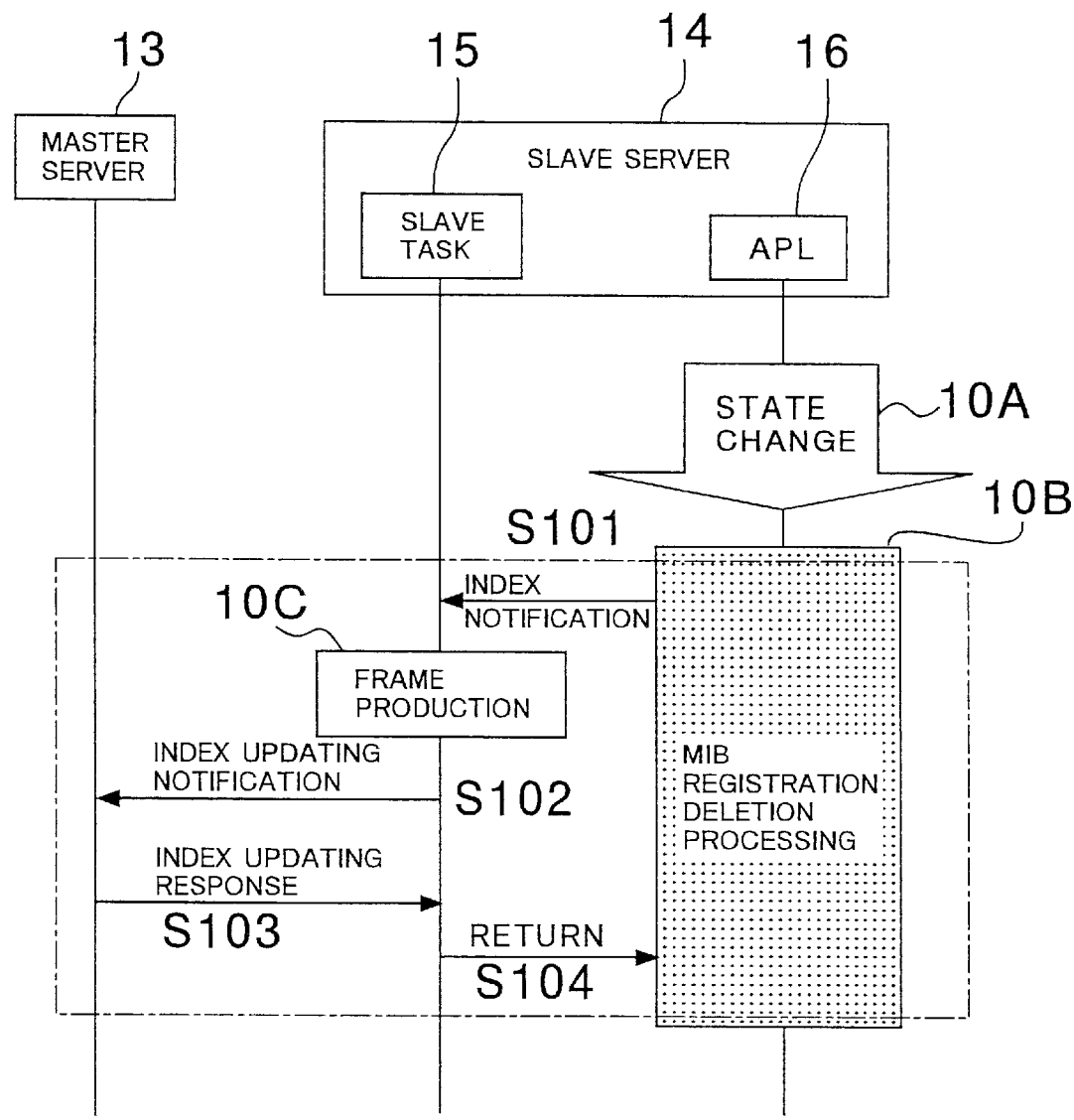
FIG. 10 is a sequence chart illustrating index updating based on an APL state change.

Index updating based on an APL state change is described with reference to FIG. 10.

This processing is performed when a variation occurs in a state of the APL 16 of the slave server 14 from a factor other than restarting of a slave server or inputting of an APL command and it is necessary to update a registration condition of the slave server. If the state of the APL 16 changes (10A), then an MIB registration/deletion processing routine (10B) is started. Thereafter, index updating is performed similarly as in the processing in the steps 8B et seq. of FIG. 8 and in the steps 9A et seq. of FIG. 9 (10B, S101 to S104 of FIG. 10).

2.4 Index Updating Timer Supervision

After the slave server 14 transmits the index updating notification to the master server 13, the slave task 15 of the slave server 14 remains in a response waiting state until an index updating response is returned thereto. A timeout supervision process is provided so that, if no updating response is received after particular time elapses after a point of time of the index updating notification, it can be discriminated that the master side is in failure.

2.4.1 Normal Processing

Figure 11:
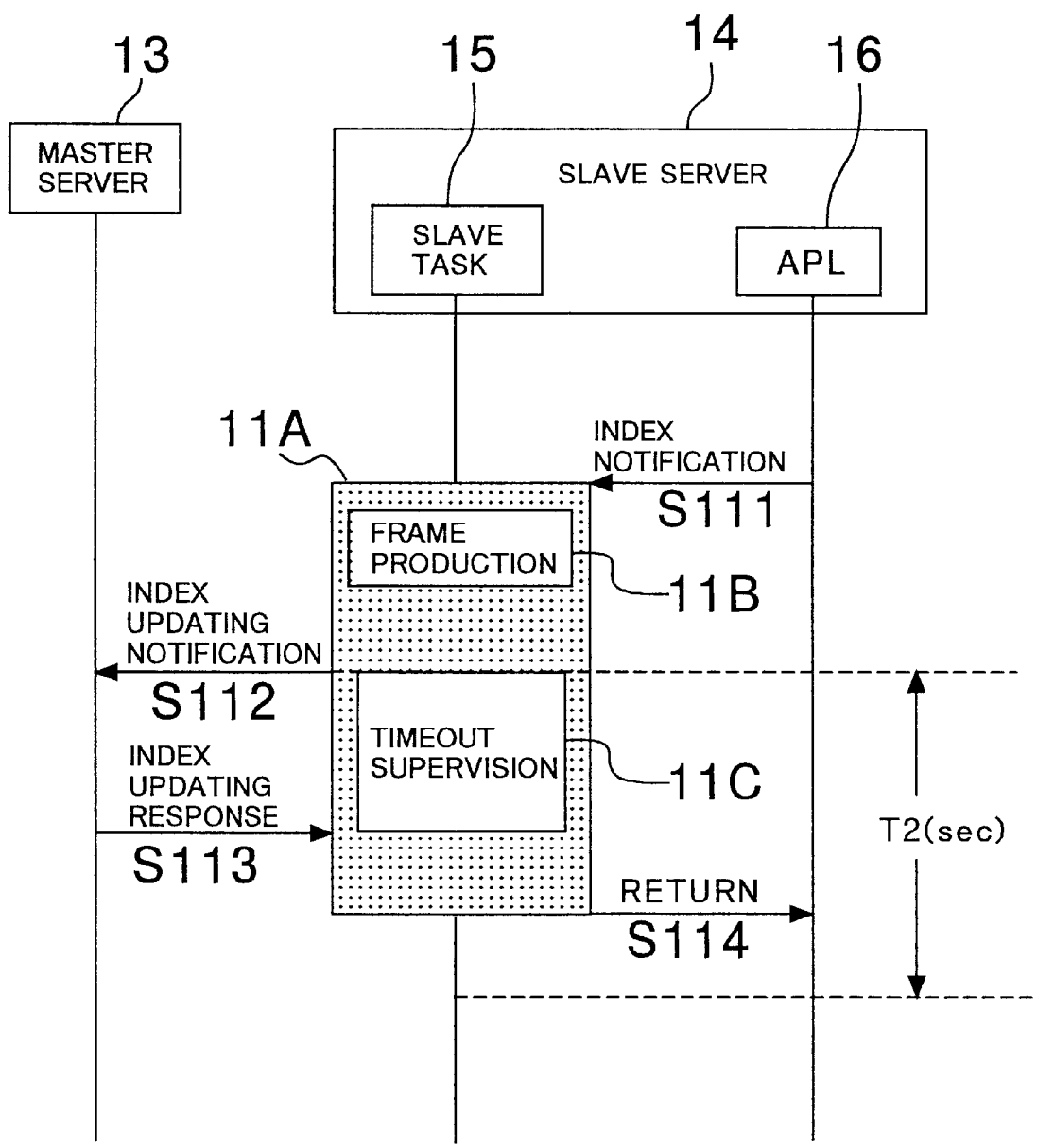
FIG. 11 is a sequence chart illustrating index updating timer supervision (normal processing)

Normal processing of the index updating timer supervision is described with reference to FIG. 11.

If the slave task 15 receives an index notification (S111) from the APL 16, then a slave task process (11A) is started on the slave task 15. As described hereinabove in connection with the index updating phase, the slave task 15 performs frame production (11B) and performs index updating notification (S112) to the master server 13. Timeout supervision (11C) is started on the slave task 15 and supervises whether or not an index updating response (S113) is received successfully within a prescribed time T2 [sec]. If an index updating response (S113) is received, then it is considered that index updating has been processed normally, and the timeout supervision (11C) is cancelled and RETURN (S114) is transmitted to the APL 16.

2.4.2 Timeout Processing

Figure 12:
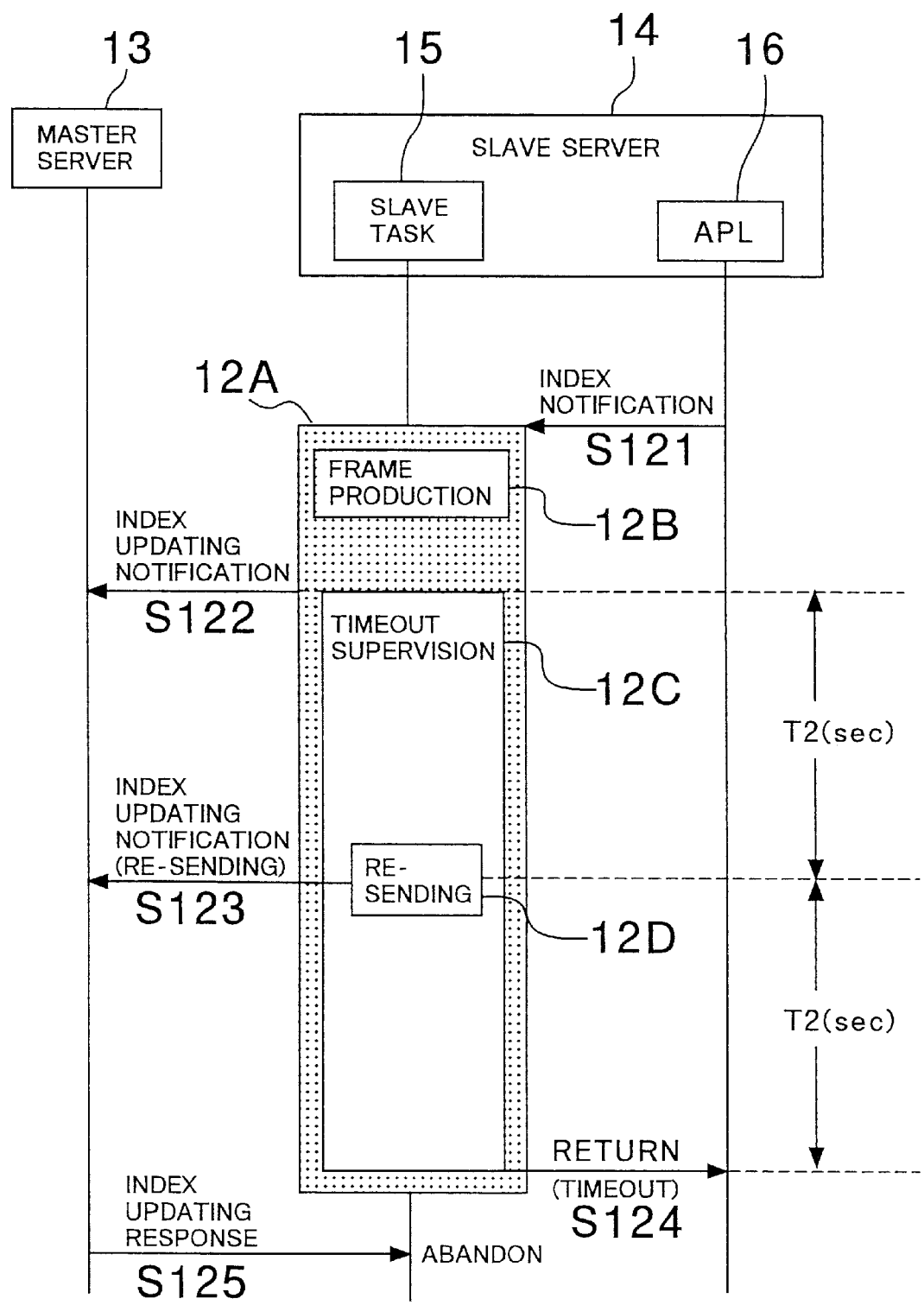
FIG. 12 is a sequence chart illustrating index updating timer supervision (timeout processing)

Timeout processing of the index updating timer supervision is described with reference to FIG. 12.

Similarly as upon normal processing, if the slave task 15 receives an index notification (S121) from the APL 16, then a slave task process (12A) is started and frame production (12B) is performed, and index updating notification (S122) to the master server 13 is performed. Timeout supervision (12C) is started on the slave task 15 and supervises whether or not an index updating response is received successfully within the prescribed time T2 [sec]. If an updating response is not received after lapse of T2 [sec], then re-sending processing (12D) is performed to re-send (S123) the index updating notification. The re-sending is performed by a predetermined number of times, that is, n times.

It is to be noted that, even if an updating response is not successfully received even after T2 [sec] elapses after the last re-sending, it is determined that some failure or processing delay has occurred with the master server 13, and RETURN (S124) of timeout is transmitted to the APL 16 so as to notify the APL 16 that the index updating has failed. At this point of time, the timeout supervision (12C) is cancelled.

If an index updating response is received as in step S125 after the timeout supervision is cancelled, then this is determined to be invalid, and the frame is abandoned by the slave task 15.

3. SNMP Operation Phase

Communication of messages between the NMS 11, ATM switch 12, master server 13 and slave server 14 is performed in accordance with the SNMP protocol. In the following, normal processing and timeout processing of the SNMP operation phase are described.

3.1 Normal Processing

Normal processing of the SNMP operation phase is described with reference to FIG. 13.

When the ATM switch 12 receives, from the NMS 11, a Get request or a Set request (S131) for an instance value of a management object managed by the SNMP agent, a Get/Set common function (13A) performs Get/Set request (S132) for an object value to the master server 13 for each Varbind. The master server 13 has a unique Get/Set request function (13B) separately from the ATM switch body 12.

In the following, a Get/Set request/response between the ATM switch 12, master server 13 and slave server 14 in FIG.

13 are described. It is to be noted that, as described in connection with the initialization phase, communication between the ATM switch 12 and the master server 13 is performed using a PVC, but communication between the master server 13 and the slave server 14 is performed using an SVC.

(1) From the ATM Switch to the Master Server (S132)

A Get/Set request (S131) decoded by the ATM switch 12 is converted into a frame with regard to all information thereof such as OID, OID length and offset and is transmitted (S132) to the master server 13 over the PVC. The Get/Set request (S132) which is performed in a unit of an MIB group is transmitted. Here, the "unit of an MIB group" signifies that, for example, in the case of LAN emulation, under an atmfLanEmulation tree, a common Get/Set interface is prepared in a unit of leClientMIB/elanMIB/lesMIB/busMIB.

(2) From the Master Server to a Slave Server (S133)

The master server 13 receiving the frame of the Get/Set request (S132) converts the OID into an internal ID by the Get/Set request function (13B) thereof and retrieves the index table. Consequently- the master server 13 finds an incorporated position (slot number) of the slave server 14 having the request OID and transmits a Get/Set request (S133) of the MIB to the slave server 14 over an SVC.

(3) From a Slave Server to the Master Server (S134)

The slave server 14 receiving the Get/Set request (S133) performs an MIB get/set processing (refer to 10B of FIG. 10) operation of the APL 16 and transmits response information such as a get data/setting state as a Get/Set response (S134) to the master server 13 over the SVC. The master server 13 performs timeout supervision for T3 [sec] for a time after the Get/Set request (S133) till the Get/Set response.(S134).

(4) From the Master Server to the ATM Switch (S135)

After the master server 13 receives the Get/Set response (S135) from the slave server 14, it only performs internal ID/OID conversion and then transmits response information as a Get/Set response (S135) to the ATM switch 12 over the PVC. The ATM switch 12 performs timeout supervision for T4 [sec] for a time after the Get/Set request (S132) till the Get/Set response (S135). If a response from the master server 13 is returned within the prescribed time T4 [sec], then the ATM switch 12 returns a value regularly as a Get/Set response (S136) to the NMS 11.

3.2 Timeout Processing

Figure 14:
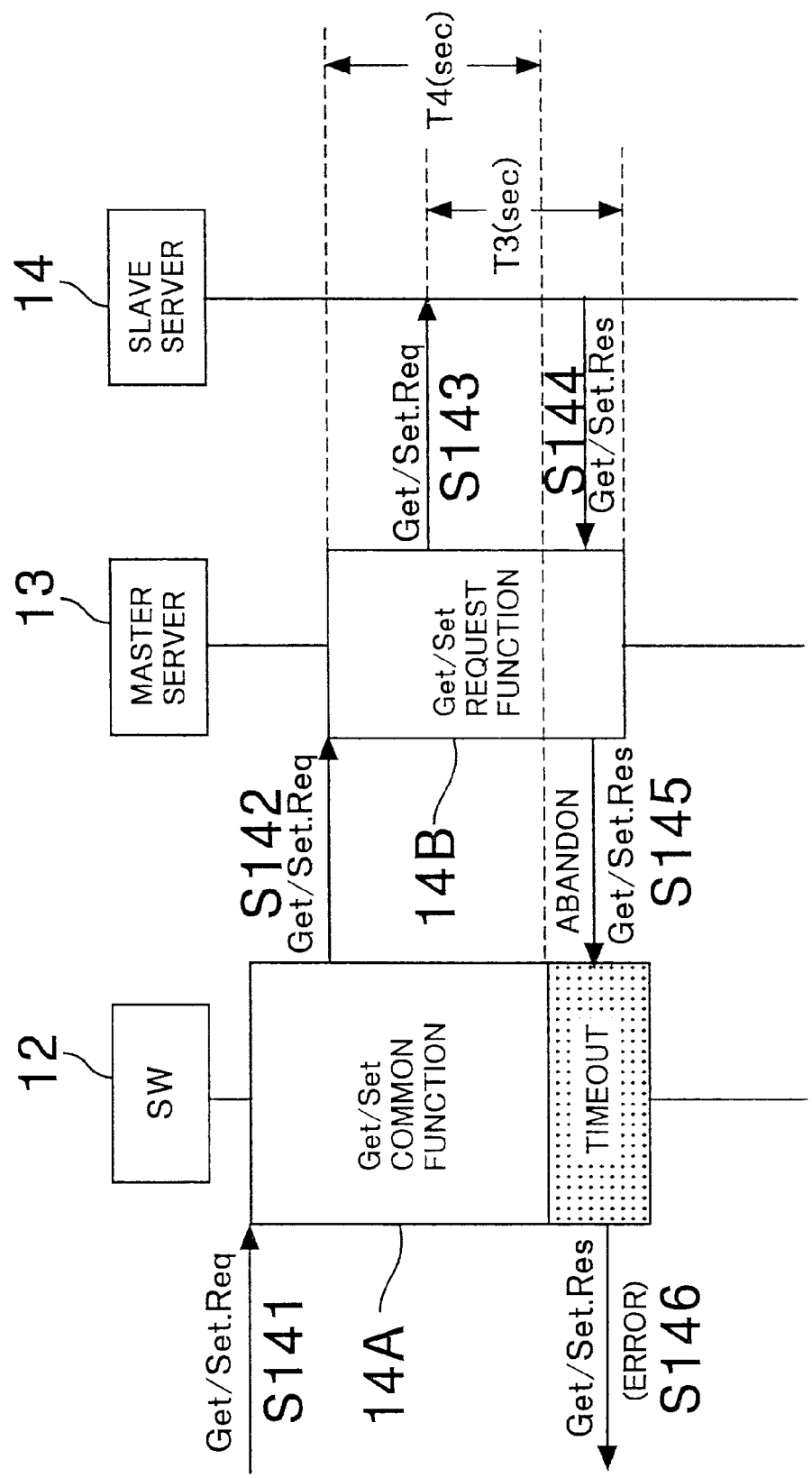
FIG. 14 is a sequence chart illustrating another SNMP operation phase (timeout processing)
Figure 15:
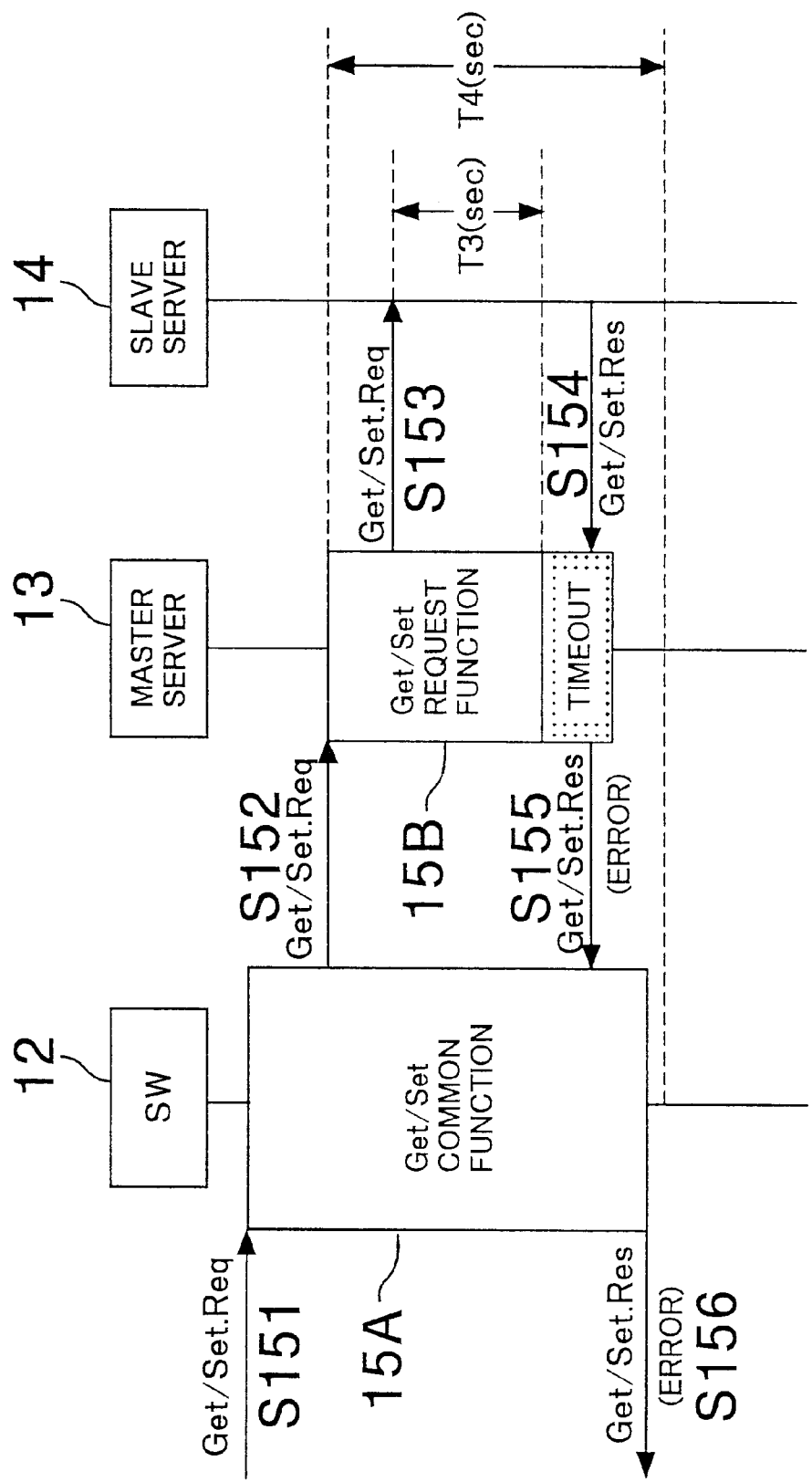
FIG. 15 is a sequence chart illustrating an SNMP operation phase (time out processing) different from FIG. 14.

As shown in FIG. 14, if a Get/Set response from the master server 13 cannot be received within the prescribed time T4 [sec] after the ATM switch 12 transmits the Get/Set request (S142) to the master server 13, the Get/Set common function (14A) determines that timeout has occurred and returns an error (S146) to the NMS 11. If a response (S145) is returned after the timeout, then this is abandoned by the Get/Set common function of the ATM switch 12.

Similarly, if a Get/Set response from the slave server 14 cannot be received within a prescribed time T3 [sec] after the master server 13 transmits the Set/Get request (S153) to the slave server 14, then the Get/Set request function (15B) determines that timeout has occurred and returns an error (S155) to the ATM switch 12. If a response (S154) is returned after the timeout, then this is abandoned by the Get/Set request function of the master server 13.

4. Failure Processing 4.1 Upon Failure of the Master Server

Figure 16:
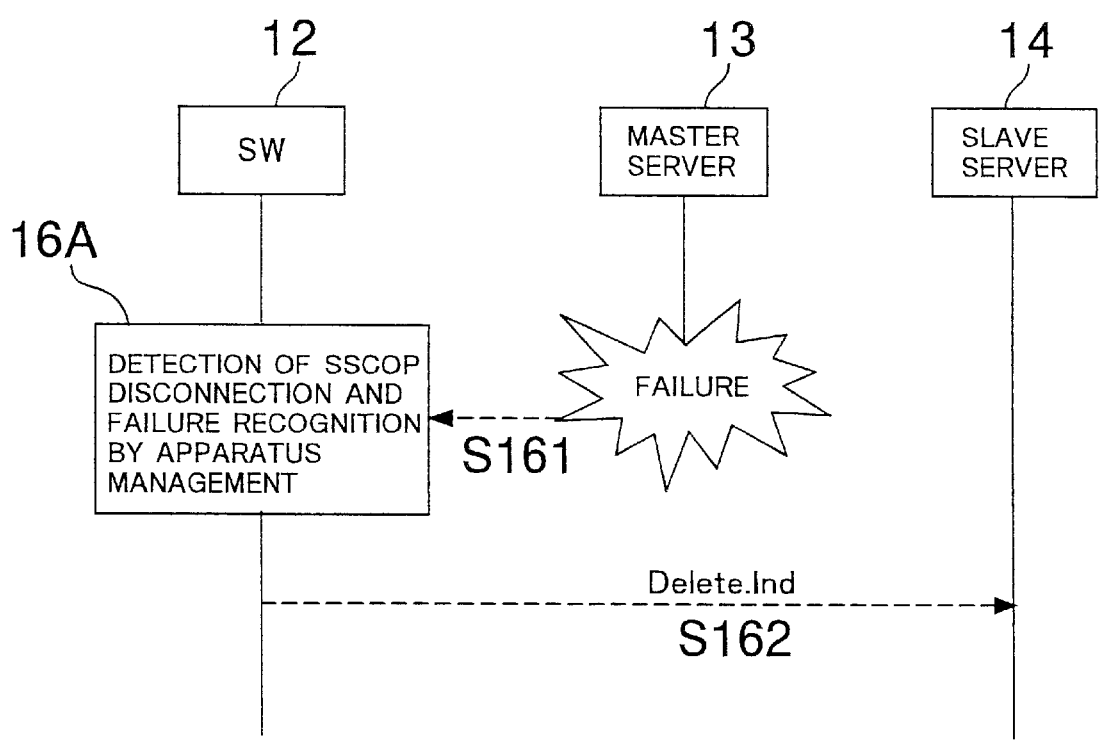
FIG. 16 is a sequence chart illustrating operation upon failure of a master server.

As shown in FIG. 16, if a failure occurs (S161) with the master server 13, then the ATM switch body 12 detects SSCOP disconnection (link disconnection) and recognizes the failure by apparatus management processing (16A). Thereafter, the ATM switch 12 notifies the slave server 14 of Delete Indication (S162), and the master-slave operation is stopped.

4.2 Upon Failure of a Slave Server

Figure 17:
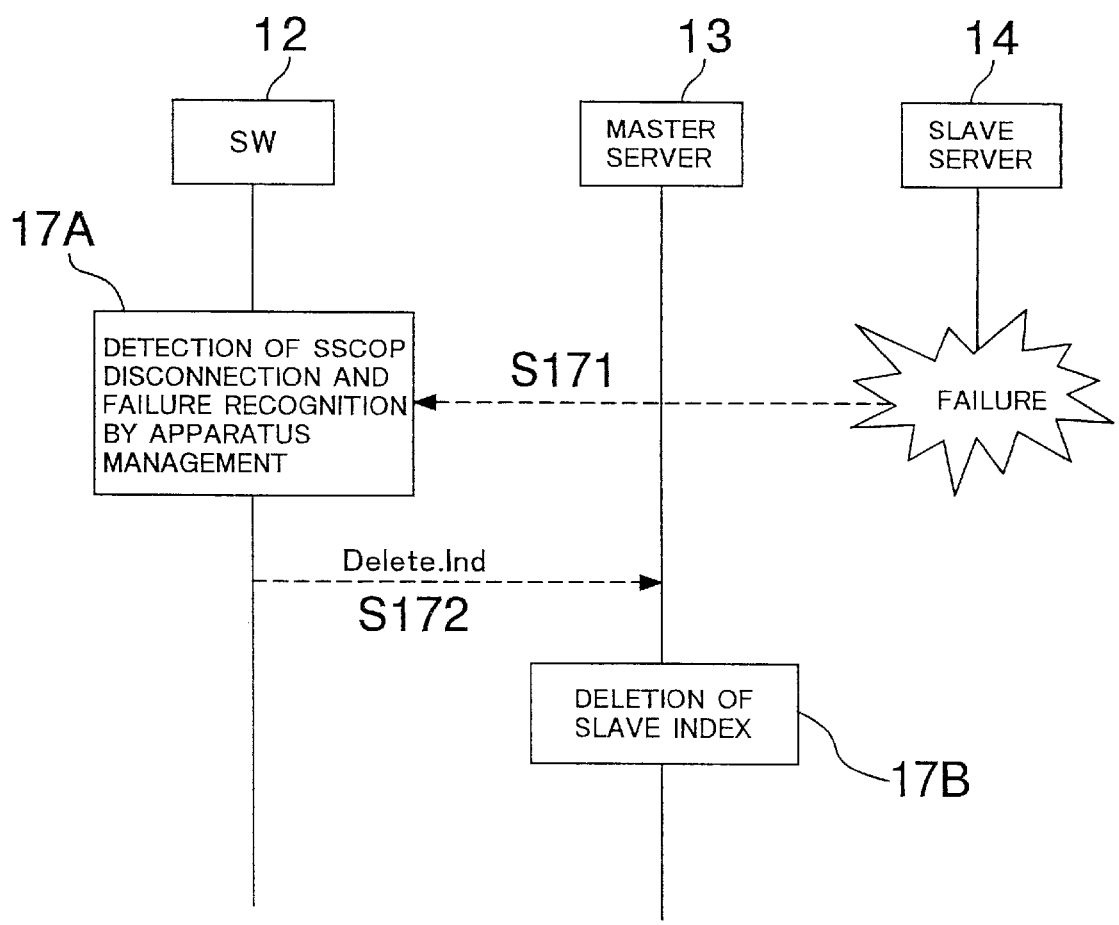
FIG. 17 is a sequence chart illustrating operation upon failure of a slave server.

As shown in FIG. 17, if a failure occurs (S171) with a slave server 14, then the ATM switch body 12 detects SSCOP disconnection (link disconnection) and recognizes the failure by an apparatus management process (17A). Thereafter, the ATM switch 12 notifies the master server 13 of Delete Indication (S172), and the master server 13 deletes the slave index registration (17B).

While a preferred embodiment of the present invention has been described using specific terms, such description is for illustrative purposes only, and it is to be understood that changes and variations may be made without departing from the spirit or scope of the following claims.

What is claimed is:

1. A management information base integrative management method for an asynchronous transfer mode server for accessing, from a network management system through an asynchronous transfer mode switch apparatus in which a plurality of servers are incorporated, a management information base of any of said servers in accordance with a simple network management protocol procedure, comprising the steps of:

setting one of said plurality of servers as a master server and setting the other ones of said plurality of servers as slave servers;

accessing, from said asynchronous transfer mode switch, said master server representatively in accordance with the simple network management protocol procedure; and accessing, from said master server, any of said slave servers over a virtual connection.

2. A management information base integrative management method for an asynchronous transfer mode server as claimed in claim 1, wherein the simple network management protocol communication between said asynchronous transfer mode switch and said master server is performed over a virtual connection.

3. A management information base integrative management method for an asynchronous transfer mode server as claimed in claim 2, wherein a permanent virtual connection is used for the communication between said asynchronous transfer mode switch and said master server, and a switched virtual connection is used for the communication between said master server and any of said slave servers.

4. A management information base integrative management method for an asynchronous transfer mode server as claimed in claim 3, wherein, upon setup over the switched virtual connection between said master server and any of said slave servers, the slave server starts up a timer thereof and retries the setup at a set time of said timer.

5. A management information base integrative management method for an asynchronous transfer mode server as claimed in claim 1, wherein said master server uses index information for management of said slave servers, and index updating notification/response are performed between said master and slave servers.

6. A management information base integrative management method for an asynchronous transfer mode server as claimed in claim 5, wherein, in an index collection phase, timeout supervision of a response is performed upon index updating from any of said slave servers to said master server.

7. A management information base integrative management method for an asynchronous transfer mode server as claimed in claim 6, wherein, when timeout of the index updating response occurs, re-sending processing of the index updating notification is performed.

8. A management information base integrative management method for an asynchronous transfer mode server as claimed in claim 1, wherein, when said asynchronous transfer mode switch body communicates with said master server in a simple network management protocol operation phase, said asynchronous transfer mode switch body communicates in a unit of an management information base group using a Get/Set common function.

9. A management information base integrative management method for an asynchronous transfer mode server as claimed in claim 8, wherein timeout supervision of the Get/Set response is performed between said asynchronous transfer mode switch and said master server and between said master server and any of said slave servers in the simple network management protocol operation phase.

10. A management information base integrative management method for an asynchronous transfer mode server as claimed in claim 1, wherein, when said master server suffers from a failure, said asynchronous transfer mode switch body automatically detects the failure and informs said slave servers of the failure so that the master-slave operation is stopped.

11. A management information base integrative management method for an asynchronous transfer mode server as claimed in claim 1, wherein, when one of said slave servers suffers from a failure, said asynchronous transfer mode switch body automatically detects the failure and informs said master server of the failure so that registration of a slave index number managed by said master server is deleted.

12. A management information base integrative management method for an asynchronous transfer mode server as claimed in claim 1, wherein said step of setting up said one of said plurality of servers as the master server and setting the other ones of said plurality of servers as the slave servers is performed via direct communication between each of said plurality of servers and said asynchronous transfer mode switch, and wherein in all other steps said slave servers do not directly communicate with said asynchronous transfer mode switch but instead must directly communicate with said master server in order to send data to or receive data from said asynchronous transfer mode switch.

13. A management information base integrative management method for an asynchronous transfer mode server as claimed in claim 1, wherein, in the setting step, the method further comprising:

sending, from said asynchronous transfer mode switch to each of the other ones of said plurality of servers which are to become said slave servers, a slave instruction;

receiving the slave instruction by said each of the other ones of said plurality of servers which are to become said slave servers, and sending back a setup instruction directly to said asynchronous transfer mode switch;

receiving the setup instruction by said asynchronous transfer mode switch and sending a connection indication signal from said asynchronous transfer mode switch to said master server and also sending a setup response confirmation signal from said asynchronous transfer mode switch to said each of the other ones of said plurality of servers which are to become said slave servers;

establishing a respective switched virtual connection between said master server and said each of the other ones of said plurality of servers which are to become said slave servers; and informing, by said each of the other ones of said plurality of servers which are to become said slave servers, said asynchronous transfer mode switch of the establishment of the respective switched virtual connection, to thereby establish said each of the other ones of said plurality of servers as said slave servers.

14. A management information base integrative management method for an asynchronous transfer mode server as claimed 13, wherein, in the setting step, the one of said plurality of servers which is to become said master server is set up as said master server by said asyhchronous transfer mode switch prior to the setting up of the other ones of said plurality of servers as said slave servers.

15. A management information base integrative management method for an asynchronous transfer mode server as claimed 13, wherein, in the setting step, the one of said plurality of servers which is to become said master server is set up as said master server and provided with a permanent virtual connection communication path for information transfer between said asynchronous transfer mode switch and said master server.

16. A management information base integrative management method for an asynchronous transfer mode server as claimed 8, further comprising:

receiving, by said asynchronous transfer mode switch, a Get/Set Request from a network management system that communicates with plurality of servers by way of said asynchronous transfer mode switch over an asynchronous transfer mode network;

transferring said Get/Set Request from said asynchronous transfer mode switch to said master server;

determining, by said master server, whether or not said Get/Set Request is directed to said master server or to one of said slave servers for information transfer to or from said network management system;

performing a direct transfer of information, either stored in said master server or to be transferred to said master server, to/from said network management system by way of said asynchronous transfer mode switch, if said information Get/Set Request is directed to said master server; and performing a transfer of information, either stored in one of said slave servers or to be transferred to said one of said slave servers, to/from said network management system by way of said asynchronous transfer mode switch and said master server, if said information Get/Set Request is directed to said one of said slave servers.

* * * * *